United States Patent
Inui et al.

(10) Patent No.: US 7,399,498 B2
(45) Date of Patent: Jul. 15, 2008

(54) MATERIAL COMPOSITION FOR PRODUCING OPTICAL WAVEGUIDE AND METHOD FOR PRODUCING OPTICAL WAVEGUIDE

(75) Inventors: Yukitoshi Inui, Aichi (JP); Kuniyoshi Kondo, Aichi (JP); Tatsuya Yamashita, Nisshin (JP); Akari Kawasaki, Aichi (JP); Manabu Kagami, Nagoya (JP); Hiroshi Ito, Kasugai (JP); Shin Sato, Tokyo (JP); Hisao Kato, Tokyo (JP)

(73) Assignee: Toyoda Gosei Co., Ltd., Nishikasugai-gun, Aichi (JP)

( * ) Notice: Subject to any disclaimer, the term of this patent is extended or adjusted under 35 U.S.C. 154(b) by 825 days.

(21) Appl. No.: 10/693,605

(22) Filed: Oct. 27, 2003

(65) Prior Publication Data

US 2004/0131320 A1    Jul. 8, 2004

(30) Foreign Application Priority Data

Oct. 28, 2002  (JP)  ............................ P2002-313421
Oct. 28, 2002  (JP)  ............................ P2002-313422

(51) Int. Cl.
*B05D 5/06* (2006.01)
(52) U.S. Cl. .................... 427/162; 427/163.2; 427/165; 430/321; 430/394; 430/290
(58) Field of Classification Search ................. 427/162, 427/163.2, 165; 430/321, 394, 290
See application file for complete search history.

(56) References Cited

U.S. PATENT DOCUMENTS 5,747,610 A    5/1998   Katoot (Continued)

FOREIGN PATENT DOCUMENTS

EP    1 211 529 A2    6/2002

(Continued)

OTHER PUBLICATIONS

Machine translation of Japanese patent publication 2000-347043; JPO; 2003.*

(Continued)

*Primary Examiner*—Alain L. Bashore
(74) *Attorney, Agent, or Firm*—McGinn IP Law Group, PLLC

(57) ABSTRACT

A transparent vessel is filled with a mixture solution containing a first photo-curable resin of a low refractive index and a second photo-curable resin of a high refractive index different in curing mechanism. When light at a wavelength capable of curing the first photo-curable resin but incapable of curing the second photo-curable resin is applied to the mixture solution through an optical fiber, the first photo-curable resin can be cured in a state in which the second photo-curable resin is enclosed in the cured first photo-curable resin. Because the refractive index increases according to curing, a self-condensing phenomenon can be generated so that an optical path portion is formed. The optical path portion emits leakage light to its surroundings to thereby form an outer circumferential portion. Then, all uncured resins in the mixture solution are cured. The outer circumferential portion containing a high percentage of the cured first photo-curable resin serves as a clad because the refractive index of the outer circumferential portion is lower than that of the optical path portion.

18 Claims, 7 Drawing Sheets

U.S. PATENT DOCUMENTS

2002/0186935 A1 12/2002 Inui et al.

FOREIGN PATENT DOCUMENTS

| EP | 1 321 781 A2 | 6/2003 |
|----|----|----|
| JP | 07-062082 | 3/1995 |
| JP | 2000-347043 | 12/2000 |
| JP | 2002-031733 | 1/2002 |
| JP | 2002-169038 | 6/2002 |
| JP | 2002-258095 | 9/2002 |
| JP | 2003-131064 | 5/2003 |

OTHER PUBLICATIONS

European Search Report dated Feb. 27, 2004.

* cited by examiner

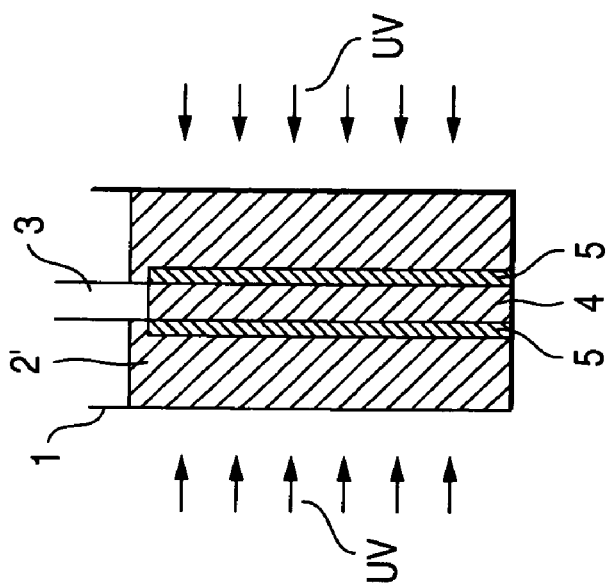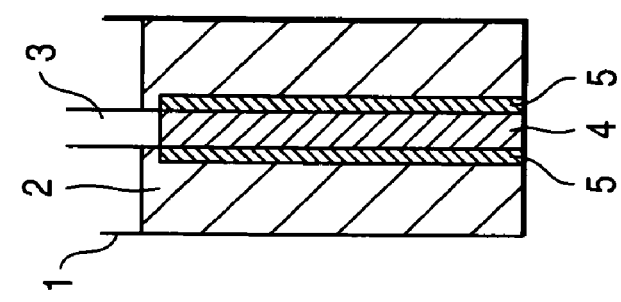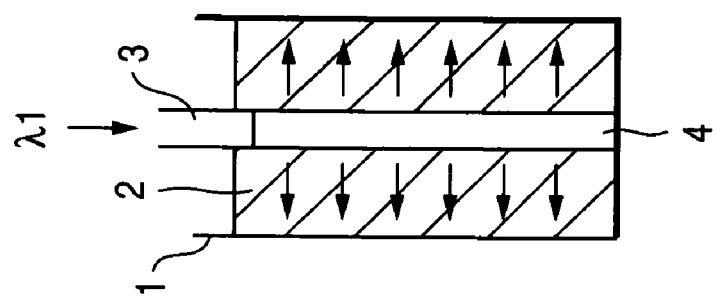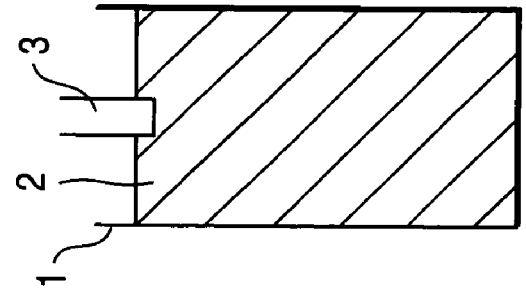

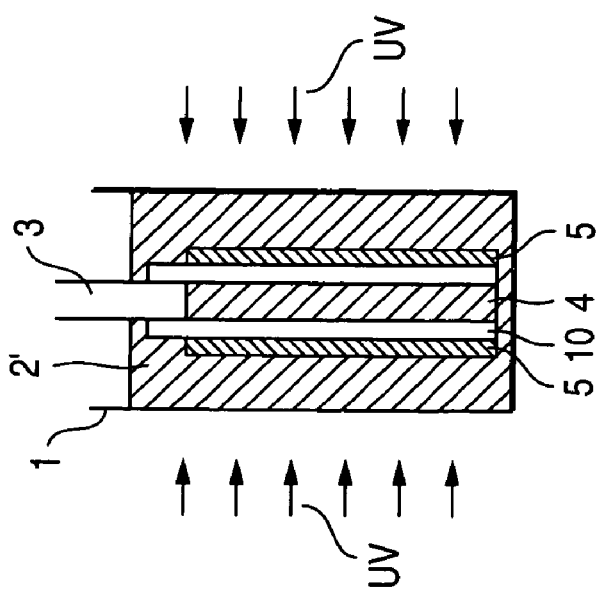
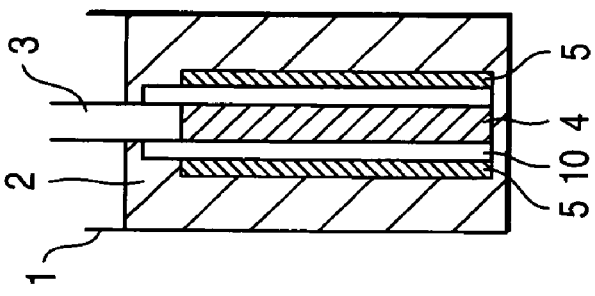
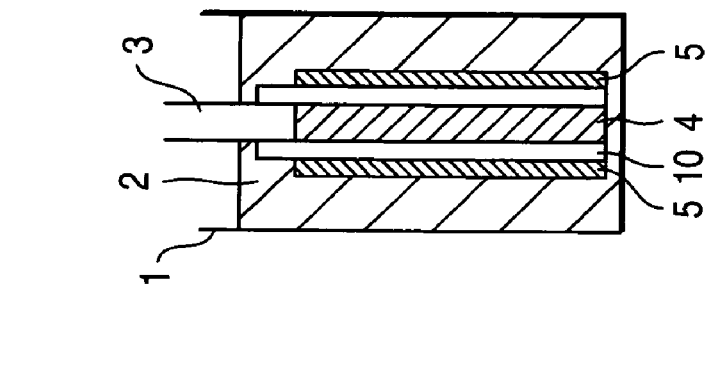
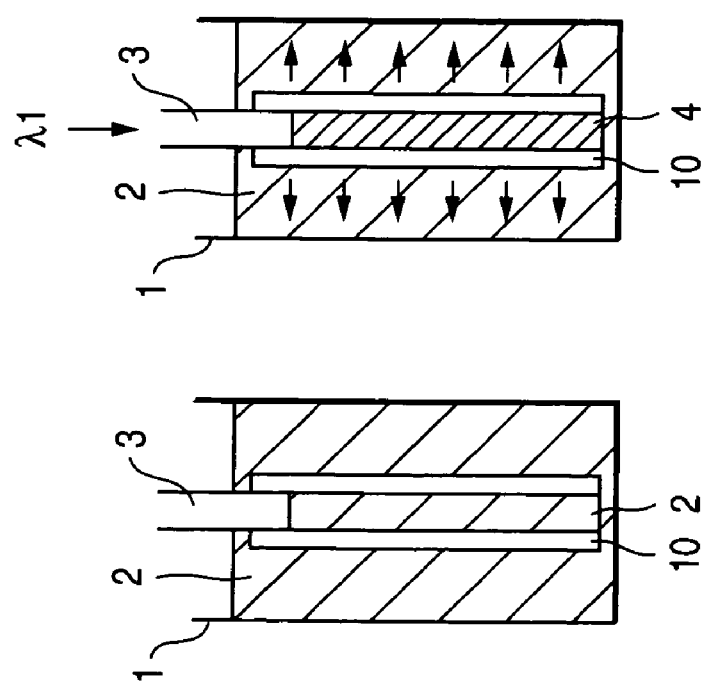

a doughnut-like intensity distribution. Hence, there is a problem that coupling efficiency of such an optical waveguide to a graded index optical fiber having the highest refractive index at the center portion of the core is not good.

MATERIAL COMPOSITION FOR PRODUCING OPTICAL WAVEGUIDE AND METHOD FOR PRODUCING OPTICAL WAVEGUIDE

The present application is based on Japanese Patent Applications Nos. 2002-313421 and 2002-313422, which are incorporated herein by reference.

BACKGROUND OF THE INVENTION

1. Field of the Invention

The present invention relates to a method for producing an optical waveguide, including the step of forming a polymer having a refractive index difference or distribution from a composition mainly containing two kinds of polymerizable monomers and/or oligomers different in polymerizing mechanism and refractive index by selective polymerization induced by the difference in polymerizing mechanism between the polymerizable monomers and/or oligomers. The invention relates to a method for producing an optical transmission path easily and inexpensively, and a material composition preferably used for the production method. The material composition for producing an optical waveguide and the method for producing an optical waveguide according to the invention can be applied to production of inexpensive low-loss optical waveguide components such as an optical interconnection, an optical demultiplexer and an optical multiplexer in the field of optical fiber communications.

2. Field of the Invention

A technique for forming an optical waveguide device by using a self-condensing phenomenon generated by introduction of beam-like light at a predetermined wavelength into a photo-curable resin mixture solution has attracted public attention.

According to the above production method, first, a predetermined vessel is filled with a mixture solution containing a photo-curable resin of a high refractive index and a photo-curable resin of a low refractive index. Then, in the condition that an end of an optical fiber is immersed in the mixture solution, light in a specific wavelength band capable of curing only the photo-curable resin of the high refractive index is introduced into the other end of the optical fiber. As a result, light is emitted from the immersed end of the optical fiber so that a cured portion of a high refractive index having a diameter equal to the core diameter of the optical fiber can be formed gradually so as to start from the immersed end of the optical fiber by use of a self-condensing phenomenon. Then, light in a predetermined wavelength band is applied on the whole mixture solution so that the two resins in the mixture solution of high and low refractive index photo-curable resins remaining in the vessel are entirely cured. In this manner, a cured portion of a low refractive index is formed around the cured portion of a high refractive index which has been already formed. That is, there is provided a technique for producing an optical waveguide having a stepwise refractive index distribution.

In the above technique, the refractive index is substantially distributed stepwise. To increase the refractive index difference between the core (high refractive index portion) and the clad (low refractive index portion), the core-forming time needs to be elongated to polymerize only the high refractive index material selectively. Hence, production efficiency is not improved. The refractive index in a section of the core is not flat accurately but slightly increases from the center to the periphery. For this reason, the near field pattern of transmission light at an end surface of the optical waveguide exhibits a doughnut-like intensity distribution. Hence, there is a problem that coupling efficiency of such an optical waveguide to a graded index optical fiber having the highest refractive index at the center portion of the core is not good.

SUMMARY OF THE INVENTION

That is, the intention is developed to solve the problem and an object of the invention is to provide a method for efficiently producing a new optical waveguide having a core center portion highest in refractive index. Another object of the invention is to provide a material composition preferably used for producing the optical waveguide.

The present inventors have eagerly examined a method for avoiding the problem in the method in the related art and have found the following fact. First, a mixture solution containing a photo-curable material of a high refractive index and a photo-curable material of a low refractive index is irradiated with light in a specific wavelength band capable of curing only the photo-curable material of the low refractive index. As a result, the photo-curable material of the low refractive index is polymerized/cured into a pattern corresponding to the shape of the applied light in a state in which the photo-curable material of the high refractive index is enclosed in the pattern. In this manner, an optical path portion (core) transparent optically can be formed. On this occasion, the photo-curable material of the high refractive index enclosed in the pattern has been not cured yet. When the light in the specific wavelength band capable of curing only the photo-curable material of the low refractive index is further continuously applied on the optical transmission path portion for a predetermined time or longer, only the photo-curable material of the low refractive index is selectively cured on a surface of the optical path portion by components of light leaked or scattered from the optical transmission path portion to thereby form a polymerized/cured material layer (pseudo-clad layer) lower in refractive index than that of the optical transmission path portion. On this occasion, the photo-curable material of the high refractive index has been not cured yet even in the case where the photo-curable material of the high refractive index is enclosed in the surface of the optical path portion. When remaining part of the mixture solution containing the photo-curable materials of the high and low refractive indices is then irradiated with light in another specific wavelength band capable of curing the two materials, a cured material portion (base portion) high in refractive index is formed around the cured material layer of the lower refractive index formed previously. In this manner, it has been found that a refractive index distribution can be formed in a section perpendicular to the direction of light irradiation so that a high refractive index portion (core) is covered with a low refractive index portion (clad layer) held on a high refractive index portion (base portion).

According to a first aspect of the invention, there is provided a method of producing an optical waveguide having an optical member taking charge of optical transmission and emitting leakage light to its surroundings and a photo-curable resin, comprising the step of curing the photo-curable resin exhibiting a lower refractive index after curing than a refractive index of an outer circumference of the optical member by using the leakage light to thereby deposit the cured photo-curable resin on a surface of the optical member.

Preferably, in the method of producing an optical waveguide according to the first aspect of the invention, the cured photo-curable resin is formed by curing a mixture solution of a first photo-curable resin of a low refractive index and a second photo-curable resin of a high refractive index different in curing mechanism; the leakage light is capable of curing the first photo-curable resin but incapable of curing the second photo-curable resin; the method further comprises the step of curing both the first photo-curable resin and the second photo-curable resin after curing the first photo-curable resin by using the leakage light; and the refractive index of at least one portion of the cured photo-curable resin decreases monotonously as the position of the cured photo-curable resin goes farther from the surface of the optical member.

According to a second aspect of the invention, there is provided a method of producing an optical waveguide having an optical path portion of a high refractive index and a portion of a low refractive index on a surface of the optical path portion by using a mixture solution of a first photo-curable resin of a low refractive index and a second photo-curable resin of a high refractive index different in curing mechanism, comprising the steps of: curing the first photo-curable resin by first light irradiation capable of curing the first photo-curable resin but incapable of curing the second photo-curable resin while enclosing the second photo-curable resin in the cured first photo-curable resin to thereby form an optical path portion transparent optically (first photo-curing step); curing the first photo-curable resin by second light irradiation capable of curing the first photo-curable resin but incapable of curing the second photo-curable resin in the same manner as the first light irradiation to thereby deposit the cured first photo-curable resin on the surface of the optical path portion after the formation of the optical path portion (second photo-curing step); and curing the second photo-curable resin enclosed in the optical path portion and uncured residual part of the mixture solution entirely by third light irradiation capable of curing both the first photo-curable resin and the second photo-curable resin (third photo-curing step). The phrase "second light irradiation in the same manner as the first light irradiation" does not mean the same intensity but means the same direction and shape of irradiation. When the wavelength in the second light irradiation is different from the wavelength in the first light irradiation, the wavelength of applied light is changed. When the wavelength in the second light irradiation is equal to the wavelength in the first light irradiation, the direction and shape of irradiation are continued. In this case, light intensity in each of the first light irradiation and the second light irradiation is optional. This rule applies to other parts of the specification.

According to a third aspect of the invention, there is provided a method of producing an optical waveguide having an optical path portion of a high refractive index and a portion of a low refractive index on a surface of the optical path portion by using a mixture solution of a first photo-curable resin of a low refractive index and a second photo-curable resin of a high refractive index different in curing mechanism, comprising the steps of: curing the first photo-curable resin by first light irradiation capable of curing the first photo-curable resin but incapable of curing the second photo-curable resin while enclosing the second photo-curable resin in the cured first photo-curable resin to thereby form an optical path portion transparent optically (first photo-curing step); curing the first photo-curable resin by second light irradiation capable of curing the first photo-curable resin but incapable of curing the second photo-curable resin in the same manner as the first light irradiation to thereby deposit the cured first photo-curable resin on the surface of the optical path portion after the formation of the optical path portion (second photo-curing step); and extracting the portion on the surface of the optical path portion and the optical path portion made of the cured first photo-curable resin with the second photo-curable resin enclosed therein from the mixture solution and curing the second photo-curable resin enclosed in the optical path portion and uncured residual part of the first photo-curable resin by third light irradiation capable of curing both the first photo-curable resin and the second photo-curable resin (third photo-curing step).

In the method according to the second and third aspects of the invention, the first light irradiation and the second light irradiation are preferably performed simultaneously so that the first photo-curable resin is cured on a side of the optical path portion while the optical path portion is formed. Further, the first light irradiation is preferably applied by an optical fiber.

For production of an optical waveguide, e.g., a step index optical fiber-like optical waveguide, it is necessary to form a core portion and a clad portion around the core portion. In the invention according the first aspect, an optical waveguide can be produced in such a manner that, after only a core portion is formed of an optical material, a photo-curable resin exhibiting a lower refractive index after curing than the refractive index of an outer circumference of the core portion is used to form a very thin clad portion on a surface of the core portion by use of light leaking from the optical material.

Assuming now that the surrounding photo-curable resin is provided as a mixture solution containing a first photo-curable resin of a low refractive index and a second photo-curable resin of a high refractive index different in curing mechanism and that the leakage light is capable of curing the first photo-curable resin but incapable of curing the second photo-curable resin, then the first photo-curable resin is cured by the leakage light in a state in which the second photo-curable resin uncured is enclosed in cured part of the first photo-curable resin. On this occasion, the enclosure depends on the viscosity of the solution, so that the proportion of the first and second photo-curable resins in a position nearest to the outer circumference of the core portion constituted by an optical material is nearly equal to that in the composition of the mixture solution but the volume percentage of the first photo-curable resin increases as the position goes farther from the position nearest to the outer circumference of the core portion. When both the first and second photo-curable resins are cured in this condition, a structure in which the refractive index is distributed so as to decrease monotonously can be formed on the outer circumference of the core portion constituted by the original optical material. For example, assuming now that the core portion constituted by the original optical material also has a structure in which the refractive index is distributed so as to decrease monotonously from the neighborhood of the center to the outer circumference, then it is possible to form an optical waveguide in which the refractive index decreases monotonously over two stages of the core and the clad.

When a mixture solution containing a first photo-curable resin of a low refractive index and a second photo-curable resin of a high refractive index different in curing mechanism is used and subjected to first light irradiation capable of curing the first photo-curable resin but incapable of curing the second photo-curable resin, the first photo-curable resin can be cured in a state in which the second photo-curable resin is enclosed in cured part of the first photo-curable resin. On this occasion, the intensity of light used in the first light irradiation needs to be increased so that the second photo-curable resin is not scattered from the first photo-curable resin. Because the refractive index increases according to curing, a self-condensing phenomenon is generated so that an optical path portion is formed. The optical path portion formed thus so as to be optically transparent is in a state of mixture of cured part of the first photo-curable resin and uncured part of the second photo-curable resin, so that the optical path portion emits leakage light to its surroundings in the direction of light transmission. When the first photo-curable resin on the outer circumference of the optical path portion is cured by such leakage light, that is, light leaked to the surroundings in the direction of light transmission by second light irradiation in the same manner as the first light irradiation, the second photo-curable resin enclosed in cured part of the first photo-curable resin can be reduced, that is, the second photo-curable resin can be scattered from cured part of the first photo-curable resin because the leakage light is weaker than the light irradiation used for forming the optical path portion. As a result, it is possible to form a circumferential portion at least containing a higher volume percentage of cured part of the first photo-curable resin than the volume percentage of cured part of the first photo-curable resin contained in the optical path portion. When all uncured resins in the mixture solution are then cured, the uncured parts of the second photo-curable resin enclosed in the cured parts of the first photo-curable resin in the optical path portion and in the outer circumference on the optical path portion can be also cured. As a result, the photo-curable resins in the same proportion as that of the mixture solution are cured at least in the optical path portion, the percentage of cured part of the first photo-curable resin contained in the outer circumferential portion on the optical path portion is higher than that in the original mixture solution, and the photo-curable resins in the same proportion of the mixture solution are cured in the outside of the outer circumferential portion. On this occasion, the refractive index of the first photo-curable resin is lower than that of the second photo-curable resin. Accordingly, the outer circumferential portion containing a high percentage of cured part of the first photo-curable resin serves as a clad because the refractive index of the outer circumferential portion is lower than that the optical path portion. In this manner, an optical waveguide can be formed easily. Incidentally, in the invention, it is not necessary to exclude the case where the refractive index decreases continuously or stepwise from the center of the optical path portion to the lowest refractive index portion of the outer circumferential portion In this specification, the expression "core, clad" is used adventurously even in the case where the refractive index decreases continuously.

When the outer circumferential portion (clad) and the optical portion (core) are taken out from the mixture solution after the formation of cured part of the first photo-curable resin in the clad and uncured part of the second photo-curable resin is cured, an optical waveguide of only the "core, clad" can be formed easily. The first light irradiation and the second light irradiation may be performed simultaneously. This means the case where the first photo-curing step and the second photo-curing step are carried out simultaneously, and includes the case where the first light irradiation and the second light irradiation are performed simultaneously by light substantially having one wavelength.

Because the shape of light irradiation for generating a self-condensing phenomenon decides the optical path portion, an axial optical path portion can be formed easily by the self-condensing phenomenon when axial light irradiation is performed. Accordingly, when the first light irradiation and the second light irradiation are performed through an optical fiber, an axial optical path portion (core) can be formed easily. The term "axial" means not only the case where the optical path portion is completely columnar but also the case where the optical path portion is partially tapered. The invention also includes the case where a mirror is disposed so that a flexing portion is provided.

According to a fourth aspect of the invention, there is provided a material composition for producing an optical waveguide, containing: a radical polymerizable material; a cationic polymerizable material; a radical polymerization initiator for initiating polymerization of the radical polymerizable material by light irradiation; and a cationic polymerization initiator for initiating polymerization of the cationic polymerizable material by light irradiation, wherein: light irradiation at a specific wavelength is effective in activating the radical polymerization initiator but ineffective in activating the cationic polymerization initiator; and the refractive index of the cured radical polymerizable material is lower than the refractive index of the cured cationic polymerizable material.

The term "radical polymerizable material" means monomer and/or oligomer having at least one reactive group that can be radically polymerized. Examples of the radical polymerizable reactive group include an acryloyl group, and a methacryloyl group. The term "cationic polymerizable material" means monomer and/or oligomer having at least one reactive group that can be cationically polymerized. Examples of the cationic polymerizable reactive group include a group having an oxirane ring (epoxide), and a group having an oxetane ring in a chemical structure. Each of the radical polymerizable material and the cationic polymerizable material may be a single compound or may be a mixture of monomers and/or oligomers different in structure. The composition in the invention may contain any compound such as a solvent having no relation with polymerization in the curing range if a necessary portion can be finally cured.

Preferably, the refractive index of the cured composition as a whole is higher by at least 0.001 than the refractive index of the cured radical polymerizable material. And the material composition for producing an optical waveguide is preferably provided as a liquid having a viscosity of not higher than 0.1 MPa·s at 25° C.

Preferably, the composition further contains a thermal polymerization initiator for initiating polymerization of the radical polymerizable material by heating.

In addition, there is provided a method of producing an optical waveguide having an optical path portion of a high refractive index and a portion of a low refractive index on a surface of the optical path portion by using an optical waveguide-producing material composition defined in the fourth aspect, comprising the steps of: curing the radical polymerizable material by first light irradiation at the specific wavelength capable of activating the radial polymerization initiator while enclosing at least the cationic polymerizable material and the cationic polymerization initiator in the cured radical polymerizable material to thereby form an optical path portion transparent optically (first photo-curing step); curing the radical polymerizable material on the surface of the optical path portion by continuing the first light irradiation after the formation of the optical path portion (second photo-curing step); and curing the cationic polymerizable material enclosed in the optical path portion and uncured residual part of the composition entirely by second light irradiation capable of activating both the radial polymerization initiator and the cationic polymerization initiator (third photo-curing step). In addition, there is provided a method of producing an optical waveguide having an optical path portion of a high refractive index and a portion of a low refractive index on a surf ace of the optical path portion by using an optical waveguide-producing material composition defined in the fourth aspect, comprising the steps of: curing the radical polymerizable material by first light irradiation at the specific wavelength capable of activating the radial polymerization initiator while enclosing at least the cationic polymerizable material and the cationic polymerization initiator in the cured radical polymerizable material to thereby form an optical path portion transparent optically (first photo-curing step); curing the radical polymerizable material on the surface of the optical path portion by continuing the first light irradiation after the formation of the optical path portion (second photo-curing step); and extracting cured part immersed in uncured part from uncured residual part of the composition and curing the uncured part immersed in the cured part by second light irradiation capable of activating both the radial polymerization initiator and the cationic polymerization initiator (third photo-curing step).

When first light capable of activating only a radical polymerization initiator is applied on a mixture containing a radical polymerizable material and a cationic polymerizable material, only part of the radical polymerizable material irradiated with the first light is cured (first photo-curing step). On this occasion, because radical polymerization is carried out quickly, the cationic polymerizable material that has not been cured yet can be enclosed in the cured part of the radical polymerizable material. When the cationic polymerizable material will be cured in a third photo-curing step after that, this portion will be formed in a state in which both the radical polymerizable material and the cationic polymerizable material are mixedly cured, so that this portion will finally serve as an optical path portion (core) having a refractive index intermediate between the refractive index of the cured radical polymerizable material and the refractive index of the cured cationic polymerizable material. On this occasion, because the refractive index of a polymerizable material after curing is generally higher than the refractive index of the polymerizable material before curing, a so-called self-condensing phenomenon occurs. That is, diffusion of applied light is reduced according to curing of the portion irradiated with the first light compared with diffusion of light before curing, so that the radical polymerizable material is cured in a state in which the cationic polymerizable material is enclosed axially in the cured part of the radical polymerizable material.

Then, in a second photo-curing step, large part of light is applied on only the optical path portion made of the cured part of the radical polymerizable material in a state in which uncured part of the cationic polymerizable material formed in the first photo-curing step is enclosed in the cured part of the radical polymerizable material because the direction etc. of light irradiation is not changed. Light slightly leaked to the outside of the optical path portion is however present as well as light totally parallel to the optical path direction is introduced into the optical path portion. As a result, the radical polymerizable material on a circumference, that is, a surface of the optical path portion made of the cured part of the radical polymerizable material enclosing the uncured part of the cationic polymerizable material is polymerized by the slight leakage light. On this occasion, since the leakage light is weak, the radical polymerizable material can be polymerized to an extent that the cationic polymerizable material is not enclosed so much as in the optical path portion formed in the first photo-curing step. That is, this is because the cationic polymerizable material can be scattered into uncured part of the mixture solution in the second photo-curing step if the curing rate of the radical polymerizable material is low though the mixed cationic polymerizable material can hardly be scattered but can be enclosed when the radical polymerizable material is cured in the first photo-curing step. As a result, the circumference, that is, the surface of the optical path portion is covered with a film made of a higher concentration of cured part of the radical polymerizable material than the concentration of cured part of the radical polymerizable material in the optical path portion.

Further, in a third photo-curing step, uncured part of the cationic polymerizable material in the optical path portion and uncured part of the remaining composition around the optical path portion having the surface covered with cured part of the radical polymerizable material are cured. As a result, there can be formed an optical waveguide composed of the following three portions: an optical path portion formed in the center portion of the optical waveguide and having a refractive index intermediate between the refractive index of cured part of the radical polymerizable material and the refractive index of cured part of the cationic polymerizable material; a peripheral portion surrounding the optical path portion and having a refractive index close to the refractive index of cured part of the radical polymerizable material; and a remaining portion surrounding the peripheral portion and having a refractive index intermediate between the refractive index of cured part of the radical polymerizable material and the refractive index of cured part of the cationic polymerizable material. Because the refractive index of cured part of the radical polymerizable material is lower than the refractive index of cured part of the cationic polymerizable material, the optical path portion having the surface covered with the low refractive index cured material portion (clad portion) can be finally used as a so-called core. The refractive index change from the core to the clad portion may be continuous. That is, the refractive index change may be provided as a step index type refractive index change or may be provided as a graded index type continuous refractive index change. Incidentally, the third photo-curing step may be carried out after the cured part impregnated with the uncured part is taken out from the uncured part of the remaining composition.

The refractive index change from the center of the optical path portion of the optical waveguide formed in the this manner toward the periphery, that is, toward the low refractive index cured material portion (clad portion) is formed so that the refractive index decreases as the position goes toward the periphery. Accordingly, the optical waveguide is good in efficiency of coupling to a graded index optical fiber. In addition, because light high in intensity is applied in the first photo-curing step for forming the optical path portion so that the cationic polymerizable material does not escape from the optical path portion, the time required for forming the core can be shortened to improve production efficiency compared with the related-art technique.

A composition adapted to the production method is very useful. When the difference between the refractive index of the cured composition as a whole and the refractive index of cured part of the radical polymerizable material is selected to be not smaller than 0.001, the refractive index difference between the highest refractive index portion of the optical path portion and the lowest refractive index portion of the periphery of the optical path portion can be formed as the refractive index difference between a core and a clad.

Because the second photo-curing step for curing at least the surface of the optical path is provided for curing only the radical polymerizable material, it is preferable that the composition is a liquid as a whole so that the cationic polymerizable material can be easily separated from the surface of the optical path portion and that the composition can be degassed suitably when a vessel is filled with the composition. Preferably, the viscosity of the liquid composition is selected to be not higher than 0.1 MPa·s. When curing in the third photo-curing step is insufficient, it is necessary to perform thermal polymerization by heating the composition. More preferably, the composition contains a thermal polymerization initiator for initiating polymerization of the radical polymerizable material by heating.

BRIEF DESCRIPTION OF THE DRAWINGS

In the accompanying drawings:

FIGS. 1A to 1D are step views showing a process for carrying out a first embodiment of the invention;

FIGS. 3A to 3D are step views showing a process for carrying out Verification Experiment 3;

DETAILED DESCRIPTION OF THE PREFERRED EMBODIMENTS

Figure 2:
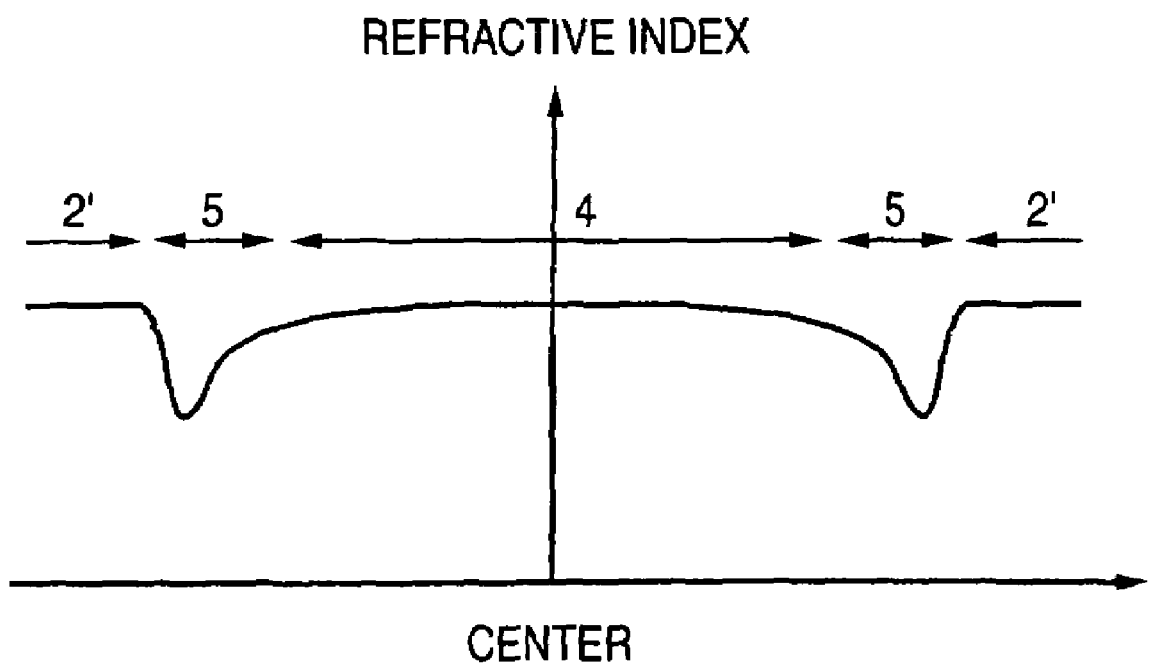
FIG. 2 is a graph showing the refractive index distribution, in a section taken in a direction perpendicular to the direction of transmission of light, of an optical waveguide formed according to the first embodiment.

Specific embodiments of the invention will be described below. In this specification, the term "parts" means parts by mass.

First Embodiment

Fifty parts of bisphenol A glycidyl ether (trade name "ADEKA OPTOMER KRM-2405" made by Asahi Denka Co., Ltd., refractive index: 1.573) as a cationic polymerizable material, 50 parts of EO-modified trimethylolpropane triacrylate (trade name SR-454 made by Sartomer Company, Inc., refractive index; 1.471) as a radical polymerizable material, 1.0 part of bis(2,4,6-trimethylbenzoyl)phenylphosphine oxide (trade name "IRGACURE 819" made by Ciba Specialty Chemicals Inc., $\lambda r=460$ nm) as a radical polymerization initiator and 3.0 parts of bis(p-t-butylphenyl)sulfonium/triarylsulfonium hexafluorophosphate (trade name "UVI-6990" made by Union Carbide Co.) diluted with a propylene carbonate solvent as a cationic polymerization initiator were mixed to prepare a photo-curable resin mixture solution 2. The refractive index of the mixture solution was 1.521 before curing. After both the radical polymerizable material and the cationic polymerizable material were cured by ultraviolet ray irradiation, the refractive index of the cured mixture as a whole was 1.551.

In the condition that a transparent vessel 1 was filled with the mixture solution 2, an end of a plastic optical fiber 3 (trade name "ESCAMEGA" made by Mitsubishi Rayon Co., Ltd., core diameter: 0.98 mm, clad diameter: 1.0 mm, numerical aperture: 0.3) was immersed in the mixture solution 2 (FIG. 1A). A laser beam (wavelength $\lambda_1=488$ nm) incident on the other end of the plastic optical fiber 3 was emitted from the immersed end of the plastic optical fiber 3 to the photo-curable resin mixture solution 2 in the transparent vessel 1, so that the photo-curable resin was cured axially by a self-forming method. On this occasion, EO-modified trimethylolpropane triacrylate was radically polymerized but bisphenol A glycidyl ether was not cationically polymerized. The formation of a 18 mm-long core 4 in 52 seconds was observed. As will be described later, the core 4 was formed by radical polymerization of EO-modified trimethylolpropane triacrylate in a state in which bisphenol A glycidyl ether was enclosed in the cured EO-modified trimethylolpropane triacrylate. When the laser beam (wavelength $\lambda_1=488$ mm) was then applied continuously, light scattered from the axial core 4 toward uncured part of the photo-curable resin mixture solution was observed (FIG. 1B). After the laser beam (wavelength $\lambda_1=488$ nm) was applied for 5 minutes, ultraviolet rays UV from a high-pressure mercury lamp were applied onto the circumference of the transparent vessel 1 evenly from the outside to entirely cure bisphenol A glycidyl ether and EO-modified trimethylolpropane triacrylate in the transparent vessel 1 to thereby form an optical waveguide having the axial core portion 4.

After the optical waveguide having the axial core portion was cut into a 15 mm-long sample, the insertion loss of the sample measured with respect to a laser beam at a wavelength of 650 nm was 2.25 dB. The transmission loss and connection loss of the optical waveguide measured with respect to a laser beam at a wavelength of 650 nm by a cut-back method were 1.44 dB/cm and 0.15 dB respectively. The refractive index distribution of the optical waveguide was measured by a two-beam interference microscope. As a result, the refractive index distribution was observed in a direction perpendicular to the direction of the length of the optical waveguide so that a low refractive index portion was formed like a film with the result that the axial core portion was covered with the low refractive index portion. The refractive index difference between the low refractive index portion and the axial core portion was 0.0157 at maximum. With respect to the refractive index distribution in the transparent vessel, the film-like portion 5 lowest in refractive index formed a trough, and the refractive index of the axial core portion 4 and the refractive index of the other portion 2' in the transparent vessel were nearly equal to 1.551 which is the refractive index of the whole in the case where both the radical polymerizable material and the cationic polymerizable material were cured. The refractive index of the core portion 4 decreased continuously from the center portion to the outer circumference. FIG. 2 is a schematic view showing the refractive index change.

Verification Experiment 1

The photo-curable resin mixture solution used in the first embodiment was injected into a transparent glass capillary tube (inner diameter: 1.0 mm, thickness: 0.2 mm, length: 24 mm, refractive index: 1.472). An end of the plastic optical fiber used in the first embodiment was inserted and fixed into an end of the transparent glass capillary tube. In this condition, a laser beam (wavelength: 488 nm) was made incident on the other end of the plastic optical fiber to observe the state of propagation of light. It was confirmed that light emitted from the plastic optical fiber was scattered toward the transparent glass capillary tube as well as being propagated through the photo-curable resin mixture solution having a refractive index of 1.521 before curing while the transparent glass capillary tube having a refractive index of 1.472 was used as a clad. It was conceived that the scattered light was caused by the large refractive index fluctuation of the photo-curable resin mixture solution because the mixture solution contained monomers widely different in refractive index.

Verification Experiment 2

A transparent vessel was filled with a mixture solution of EO-modified trimethylolpropane triacrylate (the same as described above) and bis(2,4,6-trimethylbenzoyl)phenylphosphine oxide (the same as described above) as a radical polymerization initiator. The mixture ratio of the radical polymerization initiator to EO-modified trimethylolpropane triacrylate was 1 part to 100 parts. An end of the plastic optical fiber was inserted into an end of a transparent glass capillary tube in the same manner as in Verification Experiment 1. The transparent glass capillary tube filled with the photo-curable resin mixture solution used in the first embodiment was immersed in the transparent vessel. In this condition, a laser beam (wavelength: 488 nm) was made incident on the other end of the plastic optical fiber at irradiation power of 30 mW for 5 minutes. Then, the transparent glass capillary tube filled with the photo-curable resin mixture solution was pulled up and uncured part of the mixture solution on the outer wall of the transparent glass capillary tube was removed with an organic solvent. The outer wall of the transparent glass capillary tube was observed by an electronic microscope. As a result, it was confirmed that a high-molecular polymer with a film thickness of about 20 μm was deposited on the outer wall of the transparent glass capillary tube. What was meant by this fact was that EO-modified trimethylolpropane triacrylate in the transparent vessel was cured by scattered light leaking toward a side from the transparent glass capillary tube filled with the photo-curable resin mixture solution.

Verification Experiment 3

Figure 4:
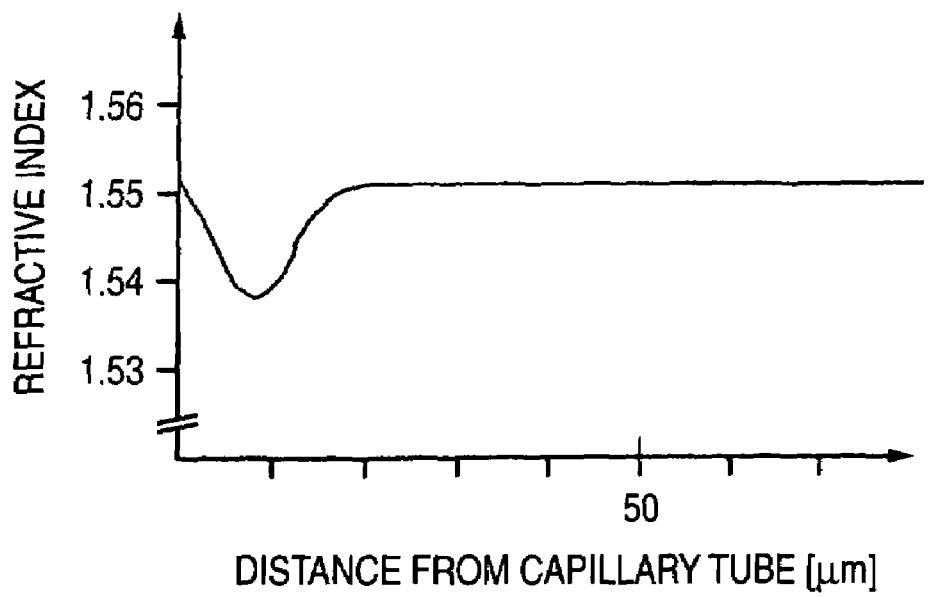
FIG. 4 is a graph showing the refractive index distribution, in a section taken in a direction perpendicular to the direction of the length of a capillary tube, of the outside of the capillary tube formed in Verification Experiment 3.
Figure 5:
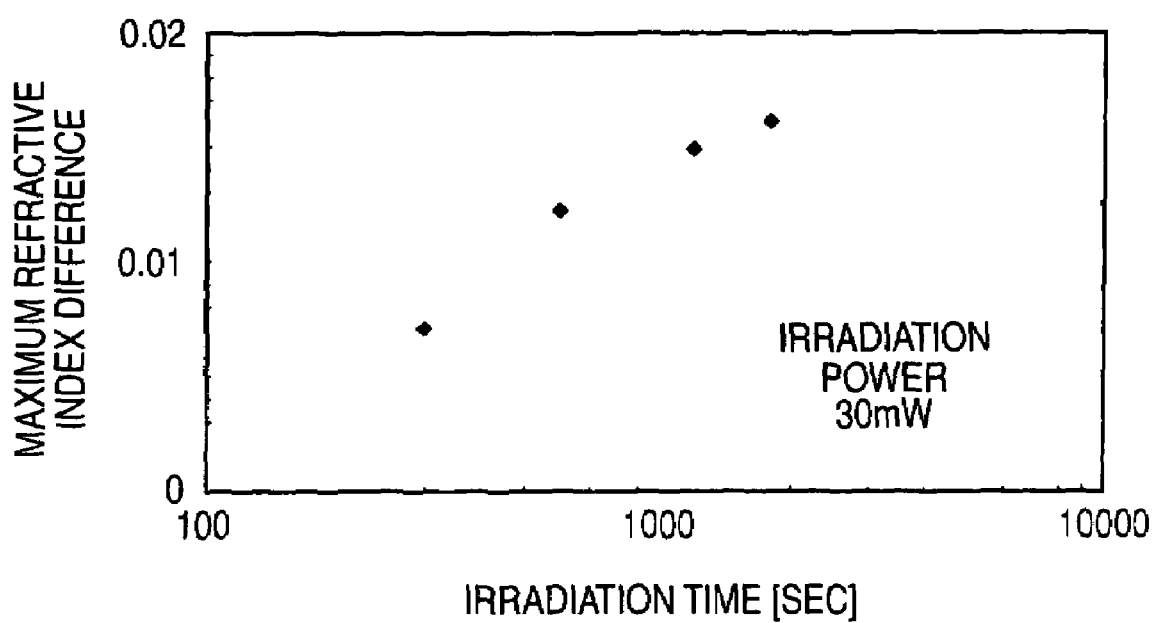
FIG. 5 is a graph showing the maximum refractive index difference in the case where irradiation time is changed in the condition of fixed irradiation power.
Figure 6:
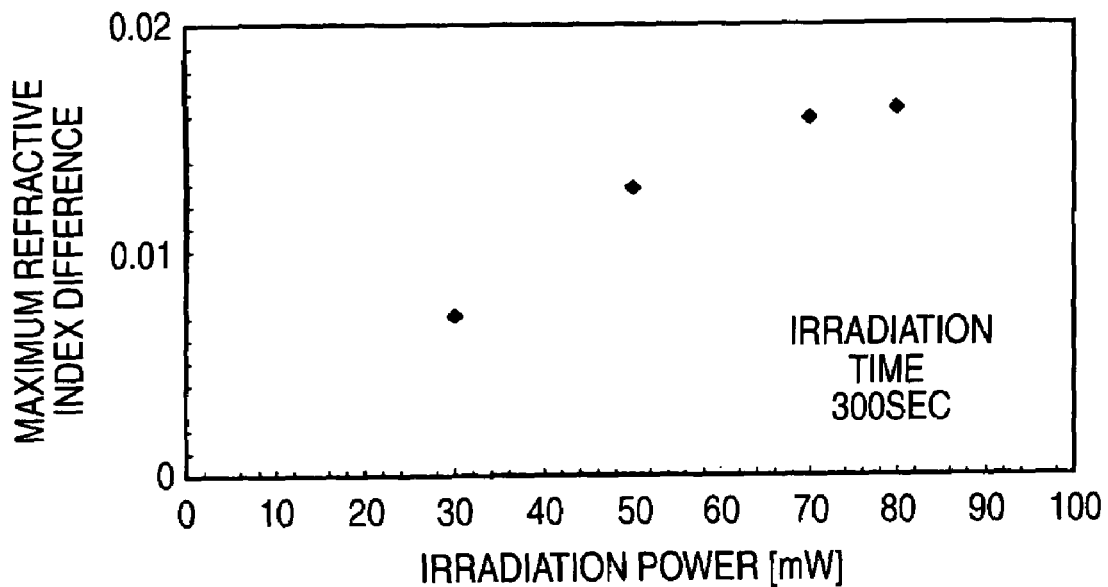
FIG. 6 is a graph showing the maximum refractive index difference in the case where irradiation power is changed in the condition of fixed irradiation time.

A transparent vessel 1 was filled with the photo-curable resin mixture solution 2 used in the first embodiment 1. An end of the plastic optical fiber 3 was inserted into an end of a transparent glass capillary tube 10 in the same manner as in Verification Experiment 1. The transparent glass capillary tube 10 filled with the photo-curable resin mixture solution 2 used in the first embodiment was immersed in the transparent vessel 1 (FIG. 3A). In this condition, a laser beam (wavelength $\lambda_1$=488 mm) was made incident on the other end of the plastic optical fiber. After the laser beam was applied for a predetermined time (FIGS. 3B and 3C), ultraviolet rays UV were applied on the circumference of the transparent vessel from the outside to cure all uncured resins (FIG. 3D). In each of samples obtained when the laser beam (wavelength: 488 nm) was made incident on the other end of the plastic optical fiber while the irradiation power and irradiation time of the laser beam were changed, the refractive index distribution from the outer wall of the transparent glass capillary tube 10 to a side (in a direction perpendicular to the direction of the length of the capillary tube) was measured by a two-beam interference microscope. FIGS. 4, 5 and 6 show results of the measurement.

FIG. 4 shows the refractive index distribution in the condition of irradiation power of 30 mW and irradiation time of 1 minute. When the distance from the capillary tube 10 was 0 μm or not smaller than 20 μm, the refractive index was 1.51. It is to be understood that the photo-curable resin mixture solution 2 was cured as it was. On the other hand, when the distance from the capillary tube 10 was not larger than 20 μm, a refractive index trough exhibiting the minimum refractive index of 1.538 was formed at the distance of 8 μm. What was meant by this fact was that the concentration of cured EO-modified trimethylolpropane triacrylate of a low refractive index was highest in this trough position.

FIG. 5 shows the maximum refractive index difference in the case where the irradiation time is changed in the condition of fixed irradiation power of 30 mW. FIG. 6 shows the maximum refractive index difference in the case where the irradiation power is changed in the condition of fixed irradiation time of 5 minutes. It is to be understood from FIGS. 5 and 6 that the maximum refractive index difference becomes large as the irradiation power becomes high or as the irradiation time becomes long.

Figure 7:
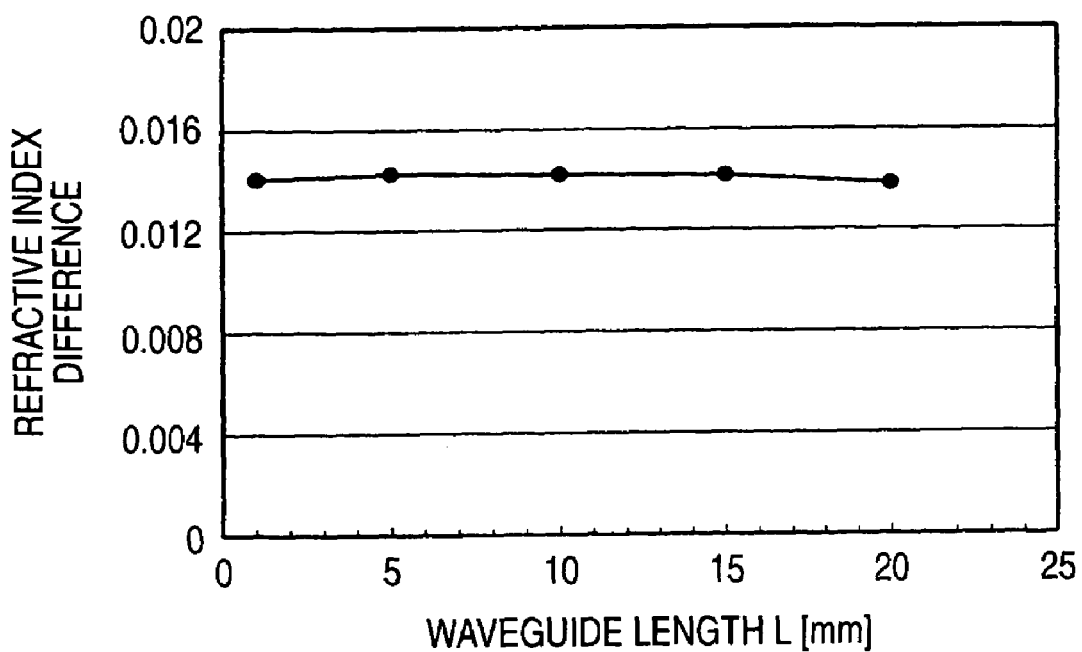
FIG. 7 is a graph showing the refractive index difference distribution in the direction of the length of the waveguide.

FIG. 7 shows the refractive index difference distribution in the direction of the length of the waveguide in the condition of irradiation power of 50 mW and irradiation time of 20 minutes. It is obvious that variation in refractive index difference in the lengthwise direction can be reduced when both irradiation power and irradiation time are adjusted to 50 mW and 20 minutes respectively. In this manner, it has been found that the invention is effective as a method for producing an optical component.

Although Verification Experiments 1 to 3 have been made on the case where a transparent glass capillary tube is used, it is conceived that a low refractive index portion is also formed in the first embodiment theoretically on the basis of the same phenomenon as in Verification Experiment 3. Although Verification Experiments 1 to 3 have been made on the case where the transparent glass capillary tube is filled with a photo-curable resin mixture solution of a high refractive index, the invention may include the case where, for example, in Verification Experiment 2, an optical component of a high refractive index capable of generating light scattered toward a side is immersed in a photo-curable resin of a low refractive index to form a film of the photo-curable resin of the low refractive index on the basis of the scattered light.

Second Embodiment

A transparent vessel 1 was filled with the mixture solution 2 used in the first embodiment and an end of a plastic optical fiber 3 was immersed in the mixture solution 2 in the same manner as in the first embodiment. A laser beam (wavelength $\lambda_1$=488 nm) incident on the other end of the plastic optical fiber 3 was emitted from the immersed end of the plastic optical fiber 3 to the photo-curable resin mixture solution 2 in the transparent vessel 1, so that the photo-curable resin was cured axially by a self-forming method. After the laser beam was then changed over to a laser beam (wavelength $\lambda_2$=458 nm), the laser beam (wavelength $\lambda_2$=458 nm) was applied in the same manner as described above. As a result, light scattered from the axial core portion 4 toward uncured part of the photo-curable resin mixture solution was observed Then, ultraviolet rays UV from a high-pressure mercury lamp were evenly applied on the circumference of the transparent vessel 1 from the outside to cure all the mixture solution 2 in the transparent vessel 1 to thereby form an optical waveguide having the axial core portion 4. As for characteristic of the optical waveguide, the transmission loss and connection loss were 1.8 dB/cm and 0.13 dB/cm respectively (with respect to light at a wavelength of 650 nm) and the maximum refractive index difference was 0.0164.

Third Embodiment

Two transparent glass plates were prepared. While the two transparent glass plates were piled so that a gap of 150 μm was formed between the two transparent glass plates, the circumferences of the two transparent glass plates were fixedly bonded to each other so that the gap was filled with the mixture solution 2 used in the first embodiment. In the condition that the two transparent glass plates were placed horizontally, a photo mask having bright and dark linear patterns was formed on a surface of one of the two transparent glass plates. The width of each of bright portions, that is, portions on which the photo mask was not formed, was set at 200 μm. In this condition, a laser beam (wavelength $\lambda_1$=488 nm) was applied on the bright portions evenly for 15 seconds. After the mask was then removed, all the mixture solution 2 was scanned with the laser beam through the glass plate to cure the mixture solution 2. The refractive index distribution was measured by a two-beam interference microscope. As a result, it was confirmed that about 15 μm-wide striped low refractive index portions having a slightly reduced refractive index were formed on opposite sides of each of 200 μm-wide striped high refractive index portions and in a direction parallel to the glass surface and to the lengthwise direction of the bright portions of the mask. High refractive index portions were formed on opposite sides of each of the two low refractive index portions. In the refractive index distribution, two smooth troughs were formed. The difference between the minimum refractive index of the low refractive index portions and the refractive index of the high refractive index portions was 0.004. On the other hand, in each portion, there was no variation in refractive index in a direction perpendicular to the glass surface. When each of the glass plates is made of a material having a refractive index lower than that of the cured portion (high refractive index portion) of the mixture solution, the 200 μm-wide high refractive index portion has low refractive index cured portions provided in the two glass plates and on opposite sides of the high refractive index portion, that is, the 200 μm-wide high refractive index portion can be used as an optical waveguide. In this case, the direction of light irradiation (perpendicular to the glass surface) for forming the high refractive index portion is different from the direction of light transmission of the formed optical waveguide (parallel to the glass surface and to the lengthwise direction of the bright portions of the mask). It was however confirmed that the low refractive index cured portions were formed in preferable positions in the same manner as in the first or second embodiment. That is, it was confirmed that scattered light was generated also in this embodiment so that portions containing a larger amount of the low refractive index cured resin were formed. According to this method, an optical path having an arbitrary width can be formed without use of any optical fiber.

Verification Experiment 4

To confirm the intermediate state of "core formation" in the invention, the following verification experiment was carried out. That is, a transparent vessel 1 was filled with the mixture solution 2 used in the first embodiment and an end of a plastic optical fiber 3 was immersed in the mixture solution 2 in the same manner as in the first embodiment. A laser beam (wavelength $\lambda_1$=488 nm) incident on the other end of the plastic optical fiber 3 was emitted from the immersed end of the plastic optical fiber 3 to the photo-curable resin mixture solution 2 in the transparent vessel 1 to start curing of the photo-curable resin by a self-forming method. After curing was performed for 30 seconds, the light irradiation was stopped. Ultraviolet rays UV from a high-pressure mercury lamp were immediately and evenly applied on the circumference of the transparent vessel 1 from the outside to cure all the mixture solution 2 in the transparent vessel 1. As a result, there was no low refractive index portion observed in a position at a distance of 10 mm from the immersed end of the optical fiber 3 in the direction of incidence of the wavelength $\lambda_1$. On the other hand, the low refractive index portion had been already formed in a position at a distance of 2 mm from the immersed end of the optical fiber 3 in the direction of incidence of the wavelength $\lambda_1$. The maximum refractive index difference was about 0.002. That is, it was confirmed that a clad portion as well as the core began to be formed insufficiently but steadily in the position at a distance of 2 mm. In this manner, it was confirmed that the formation of the clad as a low refractive index portion substantially started during the formation of the core as a high refractive index portion in the invention.

More specific explanations for various material compositions for producing the optical waveguide and other embodiment will be given hereinafter.

Radical Polymerizable Material

Photo-polymerizable monomer and/or oligomer having at least one ethylene-series unsaturated reactive group such as acryloyl group allowed to be radically polymerized, preferably at least two ethylene-series unsaturated reactive groups in a structural unit may be used as the radical polymerizable material in the invention. To obtain a low refractive index, aliphatic monomer and/or oligomer may be preferably used. Examples of the photo-polymerizable monomer/oligomer having at least one ethylene-series unsaturated reactive group may include conjugate acid esters such as (meth)acrylic ester, itaconic ester and maleic ester. The term "(meth)acrylic" means acrylic or methacrylic.

Specific examples may include (meth)acrylic ester derivatives, itaconic ester derivatives and maleic ester derivatives of polyhydric alcohol such as ethylene glycol, diethylene glycol, triethylene glycol, tetraethylene glycol, propylene glycol, dipropylene glycol, tripropylene glycol, tetrapropylene glycol, neopentyl glycol, 1,3-propanediol, 1,4-butanediol, 1,5-pentanediol, 1,6-hexanediol, trimethylolpropane, pentaerythritol, and dipentaerythritol. The radical polymerizable material may be provided as a mixture of these monomers/oligomers. To obtain greater reduction in refractive index, part of hydrogen in a structural unit may be replaced by fluorine. The radical polymerizable material is not limited to the specific examples.

Cationic Polymerizable Material

Photo-polymerizable monomer and/or oligomer which has at least one reactive ether structure such as an oxirane ring (epoxide) or an oxetane ring allowed to be cationically polymerized, preferably at least two reactive ether structures in a structural unit and which is higher in refractive index than the radical polymerizable material used in combination may be used as the cationic polymerizable material in the invention. To obtain a high refractive index, monomer/oligomer containing at least one aromatic ring such as a phenyl group in a structural unit may be preferably used. Incidentally, examples of the oxirane ring (epoxide) in the invention include oxiranyl group, and 3,4-epoxycyclohexyl group. The oxetane ring is ether having a four-membered ring structure.

Specific examples may include glycidyl ether derivatives and oxetanyl derivatives of various kinds of phenol compounds etc. such as phenyl glycidyl ether, bisphenol A, bisphenol S, bisphenol Z, bisphenol F, novolac, o-cresol novolac, p-cresol novolac, and p-alkylphenol novolac. The cationic polymerizable material may be provided as a mixture of these monomers/oligomers. To obtain a higher refractive index, hydrogen in the aromatic ring may be replaced by chlorine or bromine. The cationic polymerizable material is not limited to the specific examples. As described in Unexamined Japanese Patent Publication No. Hei-7-62082, it is known that the physical property such as polymerization curability of cured part of a mixture containing a monomer containing an oxetane ring in a structural unit and an oxirane ring (epoxide) in a structural unit is improved compared with the case where only the oxirane ring (epoxide) is contained in the structural unit of the monomer. The mixture may be a mixture containing a monomer containing at least one oxirane ring (epoxide) in a structural unit and a single monomer containing at least one oxetane ring in a structural unit or may be a mixture of monomers each containing at least one oxirane ring (epoxide) and at least one oxetane ring in a structural unit.

Radical Polymerization Initiator

A compound for activating a polymerization reaction of the radical polymerizable material containing radical polymerizable monomer and/or oligomer by light is used as the radical polymerization initiator in the invention. Specific examples of the radical polymerization initiator include: benzoin compounds such as benzoin, benzoin methyl ether, and benzoin propyl ether; acetophenone compounds such as acetophenone, 2,2-diiethoxy-2-phenylacetophenone, 2,2-diethoxy-2-phenylacetophenone, 1,1-dichloroacetophenone, 1-hydroxycyclohexylphenylketone, 2-methyl-1-(4-(methylthio)phenyl)-2-morpholinopropane-1-one, and N,N-dimethylarminoacetophenone; anthraquinone compounds such as 2-methylanthraquinone, 1-chloroanthraquinone, and 2-amylanthraquinone; thioxanthone compounds such as 2,4-dimethylthioxanthone, 2,4-diethylthioxanthone, 2-chlorothioxanthone, and 2,4-diisopropylthioxanthone; ketal compounds such as acetophenone dimethylketal, and benzyl dimethylketal; benzophenone compounds such as benzophenone, methylbenzophenone, 4,4'-dichlorobenzophenone, 4,4'-bisdiethylaminobenzophenone, Michler's ketone, and 4-benzoyl-4'-methyldiphenylsulfide; and 2,4,6-trimethylbenzoyldiphenylphosphine oxide.

Incidentally, a radical polymerization initiator may be used singly or two or more kinds of radical polymerization initiators may be used in combination. The radical polymerization initiator used is not limited to these specific examples.

Cationic Polymerization Initiator

A compound for activating a polymerization reaction of the cationic polymerizable material containing cationic polymerizable monomer and/or oligomer by light is used as the cationic polymerization initiator in the invention. Specific examples of the cationic polymerization initiator include diazonium salt, iodonium salt, sulfonium salt, selenium salt, pyridinium salt, ferrocenium salt, phosphonium salt, and thiopyrinium salt. Especially, an onium salt photo-polymerization initiator relatively thermally stable, such as aromatic iodonium salt or aromatic sulfonium salt, may be preferably used. Examples of the aromatic iodonium salt include diphenyliodonium, ditolyliodonium, phenyl(p-anisyl)iodonium, bis(p-t-butylphenyl)iodonium, and bis(p-chlorophenyl)iodonium. Examples of the aromatic sulfonium salt include diphenylsulfonium, ditolylsulfonium, phenyl(p-anisyl)sulfonium, bis(p-t-butylphenyl)sulfonium, and bis(p-chlorophenyl)sulfonium. When the onium salt photo-polymerization initiator such as aromatic iodonium salt or aromatic sulfonium salt is used, anions are $BF_4^-$, $AsF_6^-$, $SbF_6^-$, $PF_6^-$, $B(C_6F_5)_4^-$, etc. Incidentally, an cationic polymerization initiator may be used singly or two or more kinds of cationic polymerization initiators may be used in combination. The cationic polymerization initiator used is not limited to these specific examples.

Selection and Mixture Ratio

In the material composition containing the aforementioned constituent members for producing an optical waveguide according to the invention, the radical polymerizable material and the cationic polymerizable material selected from the aforementioned examples are combined with each other while the mixture ratio of the radical polymerizable material to the cationic polymerizable material is selected to satisfy the relation $n_r < n_{rc} < n_c$ and $(n_{rc}-n_r) \geq 0.001$, preferably $(n_{rc}-n_r) \geq 0.003$, more preferably $(n_{rc}-n_r) \geq 0.01$, in which $n_r$ is the refractive index of polymerized/cured part of the radical polymerizable material in the case where the radical polymerizable material is used singly, $n_c$ is the refractive index of polymerized/cured part of the cationic polymerizable material in the case where the cationic polymerizable material is used singly, and $n_{rc}$ is the refractive index of polymerized/cured part of the composition as a whole. Incidentally, all refractive indices used in this specification mean refractive indices measured at D emission line light (589 nm) of sodium. When the difference $(n_{rc}-n_r)$ between $n_{rc}$ and $n_r$ is not smaller than 0.01, a particularly useful optical waveguide can be produced because the difference $\Delta n$ between the maximum refractive index $n_{max}$ (substantially equal to $n_{rc}$) of the center of the optical path portion (core) and the minimum refractive index $n_{min}$ ($n_{rc} > n_{min} > n_r$) of the outer circumference of the optical path portion can be easily selected to be not smaller than 0.001.

Preferably, the mixture ratio (mass ratio, which also applies hereunder) of the radical polymerizable material to the cationic polymerizable material is selected to be in a range of from 20:80 to 90:10 in addition to the condition that the relation $(n_{rc}-n_r) \geq 0.001$, preferably $(n_{rc}-n_r) \geq 0.003$ is satisfied. If the mixture ratio of the radical polymerizable material is lower than 20% of the composition, the amount of monomer (and/or oligomer) of the radical polymerizable material is insufficient in the first photo-curing step in the optical waveguide producing method which will be described below. For this reason, a long time is required for first forming the optical transmission path portion and it is difficult to form the optical transmission path portion having sufficient strength even if the optical transmission path portion can be formed. Although it is not impossible to select the mixture ratio of the cationic polymerizable material to be lower than 10%, it is necessary to select a material remarkably high in refractive index as the cationic polymerizable material in order to satisfy the relation $(n_{rc}-n_r) \geq 0.003$ in the condition that the mixture ratio of the cationic polymerizable material is lower than 10%. Because such a cationic polymerizable material is generally solid when used singly, a complex operation is undesirably required for mixing the cationic polymerizable material with the radical polymerizable material homogeneously. That is, it is necessary to select a material having the property of a solvent as the radical polymerizable material and mix the radical polymerizable material with the cationic polymerizable material. Or it is necessary to dissolve the cationic polymerizable material in a solvent provided separately, mix/prepare the solution with the radical polymerizable material and then remove the solvent component from the solution.

In the material composition containing the constituent members for producing an optical waveguide according to the invention, the radical polymerization initiator is a compound capable of being activated by light irradiation at a wavelength of not larger than a specific wavelength $\lambda_r$ whereas the cationic polymerization initiator is a compound capable of being activated by light irradiation at a wavelength of not larger than a specific wavelength $\lambda_c$. Each of the compound capable of being activated by light irradiation at a wavelength of not larger than a specific wavelength $\lambda_r$, and the compound capable of being activated by light irradiation at a wavelength of not larger than a specific wavelength $\lambda_c$ is a compound having an optical absorption end (the longest absorption wavelength in optical absorption) at a wavelength of not larger than a specific wavelength. In the optical waveguide producing method which will be described below, specific wavelength band light $\lambda_1$ used in the first light irradiation in the first and second photo-curing steps and specific wavelength band light $\lambda_2$ used in the second light irradiation in the third photo-curing step need to satisfy the relation $\lambda_1 > \lambda_2$. Accordingly, the combination of the aforementioned compounds can be selected arbitrarily if the relation $\lambda_r > \lambda_c$ is satisfied. That is, the respective wavelengths may be preferably selected to satisfy the relation $\lambda_r > \lambda_1 > \lambda_c > \lambda_2$. The wavelengths $\lambda_1$ and $\lambda_2$ mean wavelength bands respectively. That is, the wavelengths $\lambda_1$ and $\lambda_2$ do not indicate single wavelength light beams and are not limited to light irradiation in predetermined wavelength bands in the first, second and third photo-curing steps. It is a matter of course that the invention may include the case where the intensity of applied light is changed in the middle of each step.

Preferably, materials mutually soluble to the mixture solution containing the radical polymerizable material and the cationic polymerizable material are selected as the radical polymerization initiator and the cationic polymerization initiator. More preferably, a material having a specific wavelength $\lambda_r$ longer than $\lambda_c$ is used as the radical polymerization initiator because the specific wavelength $\lambda_c$ of the cationic polymerization initiator is generally not longer than 400 nm. More preferably, a material capable of causing a decomposition reaction by light irradiation in a specific wavelength band $\lambda_2$ ($\leq \lambda_c$) used in the second light irradiation in the optical waveguide producing method which will be described below is used as the radical polymerization initiator. Examples of the radical polymerization initiator especially preferably used may include: 2,4,6-trimethylbenzoyldiphenylphosphine oxide ($\lambda_r$=430 nm, trade name "Lucirin TPO" made by BASF Corporation); bis(2,4,6-trimethylbenzoyl)phenylphosphineoxide ($\lambda_r$=460 nm, trade name "IRGACURE 819" made by Ciba Specialty Chemicals Inc.); and a mixture ($\lambda_r$=440 nm, trade name "IPGACURE 1850" made by Ciba Specialty Chemicals Inc.) containing bis(2,6-dimethoxybenzoyl)-2,4,4-trimethylpentylphosphine oxide (50%) and 1-hydroxycyclohexylphenyl ketone (50%). Incidentally, the radical polymerization initiator is not limited to the aforementioned examples.

The amount of the radical polymerization initiator is selected to be in a range of from 0.05 parts by mass to 10 parts by mass, preferably in a range of from 0.1 parts by mass to 5 parts by mass, with respect to 100 parts by mass of the radical polymerizable material. The amount of the cationic polymerization initiator is selected to be in a range of from 0.1 parts by mass to 20 parts by mass, preferably in a range of from 1 part by mass to 10 parts by mass, with respect to 100 parts by mass of the cationic polymerizable material.

Necessity of Postcure

A thermal polymerization initiator capable of initiating radical polymerization may be contained in the material composition for producing an optical waveguide according to the invention. Generally, when only photo-polymerization is applied to photo-polymerizable monomer (and/or oligomer), a small amount of unpolymerized part of the monomer (and/or oligomer) remains in a system. Therefore, so-called postcure is generally performed for completing polymerization.

On the other hand, when postcure is performed just after photo-polymerization of the cationic polymerizable monomer (and/or oligomer), thermal polymerization is induced by cationic seeds (cationic side of the cationic polymerization initiator as salt) remaining in the system. It is however difficult to complete polymerization of remaining part of the radical polymerizable monomer (and/or oligomer) by postcure because it is conceived that radical seeds in the system vanish just after the stop of light irradiation. Also in the optical waveguide producing method according to the invention which will be described below, a small amount of the radical polymerizable material and a small amount of the cationic polymerizable material unpolymerized by the second light irradiation remain in the system. Therefore, postcure is effective in improving thermal stability of the final product. For this reason, mixing of the thermal polymerization initiator is effective in postcuring remaining monomer (and/or oligomer) of the radical polymerizable material made of the radical polymerizable monomer (and/or oligomer).

Thermal Polymerization Initiator

Examples of the thermal polymerization initiator include organic peroxide, and azo compounds. Generally, azo compounds are riot preferred because nitrogen is produced with the advance of decomposition of the azo compounds. Organic peroxide is preferred. Specific examples of the organic peroxide include 3,5,5-trimethylhexanoyl peroxide, lauryl peroxide, benzoyl peroxide, 1,1-bis(t-butylperoxy)-2-methylcyclohexane, 1,1-bis(thexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-dibutylperoxycyclohexyl)propane, 1,1-bis(t-butylperoxy)cyclododecane, t-hexylperoxyisopropyl monocarbonate, t-butyl peroxymaleate, t-butyl peroxy-3,5,5-trimethylhexanoate, t-butyl peroxylaurate, 2,5-dimethyl-2,5-di(m-toluoylperoxy)hexane, t-butylperoxyisopropyl monocarbonate, t-butylperoxy-2-ethylhexyl monocarbonate, t-hexyl peroxybenzoate, 2,5-dimethyl-2,5-dibenzoylperoxyhexane, t-butyl peroxyacetate, 2,2-bis(t-butylperoxy)butane, t-butyl peroxybenzoate, n-butyl 4,4-bis(t-butylperoxy)valerate, di-t-butyl peroxyisophthalate, α,α'-bis(t-butylperoxy)diisopropylbenzene, cumyl peroxide, 2,5-dimethyl-2,5-di(t-butylperoxy)hexane, t-butylcumyl peroxide, t-butyl peroxide, p-menthane hydroperoxide, 2,5-dimethyl-2,5-di(t-butylperoxy)hexine-3, diisopropylbenzene hydroperoxide, t-butyltrimethylsilyl peroxide, 1,1,3,3-tetramethylbutyl hydroperoxide, cumyl hydroperoxide, t-hexyl hydroperoxide, and t-butyl hydroperoxide.

Incidentally, it is necessary to consider the storage temperature of the composition, the postcure temperature and the postcure time in selection of the thermal polymerization initiator because addition of the thermal polymerization initiator may cause lowering of thermal stability of the material composition for producing an optical waveguide according to the invention. From this point of view, it is preferable that the temperature range for obtaining a half-life period of the thermal polymerization initiator by thermal decomposition is from 50° C. to 100° C. when the storage temperature of the composition is room temperature and the postcure time is 10 hours. Examples of the organic peroxide satisfying this condition may include, 3,5,5-trimethylhexanoyl peroxide (60° C., tradename "PEROYL355" made by NOF Corporation); lauryl peroxide (62° C., trade name "PEROYL L" made by NOF Corporation); benzoyl peroxide (74° C., trade name "NYPER B" made by NOF Corporation); 1,1-bis(t-butylperoxy)-3,5,5-trimethylcyclohexane (90° C., trade name "PER- HEXA 3M" made by NOF Corporation); 1,1-bis(t-butylperoxy)cyclohexane (91° C., trade name "PERHEXA C" made by NOF Corporation); t-butyl peroxy-3,5,5-trimethylhexanoate (97° C., trade name "PERBUTYL 355" made by NOF Corporation); and t-butylperoxyisopropyl monocarbonate (98° C., trade name "PERBUTYL I" made by NOF Corporation). Incidentally, the thermal polymerization initiator is not limited to these examples. The amount of the thermal polymerization initiator added is selected to be in a range of from 0.01% by mass to 5% by mass, preferably in a range of from 0.05% by mass to 1% by mass, with respect to 100% by mass of the material composition for producing an optical waveguide according to the invention.

In the optical waveguide producing method which will be described below, a cured region capable of transmitting light is formed by the first light irradiation. Further, a cured region for protecting the cured region capable of transmitting light is formed by the second light irradiation. The production method has an advantage in that an optical transmission path and a cured region for protecting the optical transmission path can be formed in a state in which an optical filter or a 45° reflecting mirror is disposed in an optical transmission path system in the same manner as in the production method disclosed in Patent Document 1 or 2. It is therefore necessary to dispose an optical component such as an optical filter or a mirror in the optical path transmission path system before the formation of the optical transmission path starts. To achieve this, the composition for producing an optical transmission path or an optical waveguide used in the invention needs to be a liquid. The liquidity of the composition can be expressed as viscosity. Preferably, the composition for used in the production method adapted for production of an optical transmission path or an optical waveguide according to the invention is provided as a liquid having a viscosity of not higher than 0.1 MPa·s at room temperature of 25° C. The viscosity largely depends on the viscosity of the mixture of the radical polymerizable material and the cationic polymerizable material in a preferred composition condition. From the point of view of improvement in efficiency in degassing from composition and packing of the composition, it is preferable that the viscosity is as low as possible. If the composition has a viscosity of not higher than 0.1 MPa·s, it is not impossible to pack the composition in a state in which the optical component is disposed on the other hand, if the viscosity of the composition is higher than 0.1 MPa·s, it is undesirable for the production method that a disadvantage of mixing of air bubbles or movement of the optical component occurs easily due to the excessively high viscosity when the composition is packed in a state in which the optical component is disposed.

An example of the configuration of the material composition for producing an optical waveguide according to the invention is as follows. An aliphatic meth(acrylic) monomer is used as the radical polymerizable material. A bisphenol epoxy monomer or a mixture containing a bisphenol epoxy monomer and an aromatic substituent group-containing oxetane monomer is used as the cationic polymerizable material. The mass composition ratio of the radical polymerizable material to the cationic polymerizable material is selected to be in a range of from 10:90 to 90:10, preferably, in a range of from 20:80 to 85:15. When a mixture containing a bisphenol epoxy monomer and an aromatic substituent group-containing oxetane monomer is used as the cationic polymerizable material, the mass composition ratio of the bisphenol epoxy monomer to the aromatic substituent group-containing oxetane monomer is selected to be in a range of from 0:100 to 100:0. The mass composition ratio may be selected in consideration of the forming rate and mechanical strength of the core, the mechanical strength and reliability of the clad portion, etc. in the optical waveguide producing method according to the invention which will be described below.

As an example of the radical polymerization initiator, 0.05 parts by mass to 10 parts by mass, preferably 0.1 parts by mass to 5 parts by mass of bis(2,4,6-trimethylbenzoyl)phenylphosphine oxide (trade name "IRGACURE 819" made by Ciba Specialty Chemicals Inc.) are added to 100 parts by mass of the radical polymerizable material. Incidentally, the kind and use amount of the radical polymerization initiator depend on spectral characteristic of the optical density or absorbancy of the radical polymerization initiator and the wavelength of a light source used for photo-curing the radical polymerizable material. The radical polymerization initiator is preferably used so that the optical density of the radical polymerization initiator at the wavelength is not larger than 2. As an example of the cationic polymerization initiator, 0.1 parts by mass to 20 parts by mass, preferably 1 part by mass to 10 parts by mass of bis(p-t-butylphenyl)sulfonium/triarylsulfonium hexafluorophosphate (trade name "UVI-6990" made by Union Carbide Co.) diluted with a propylene carbonate solvent are added to 100 parts by mass of the cationic polymerizable material.

Method for Producing Waveguide

Figure 8A:
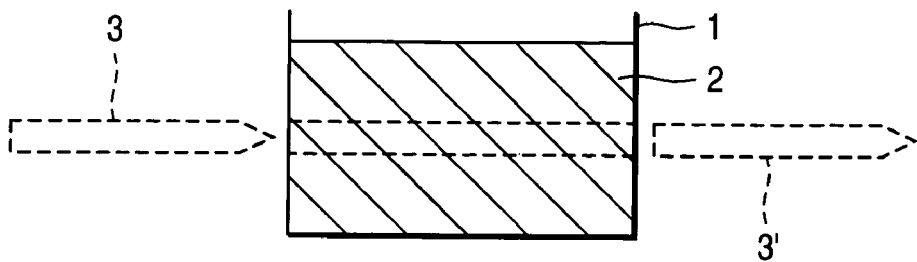
FIGS. 8A to 8D are step views showing a method for producing an optical waveguide according to a specific embodiment of the invention.
Figure 8B:
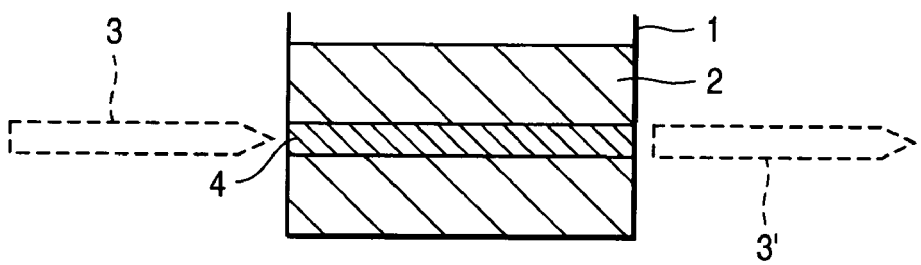
Figure 8C:
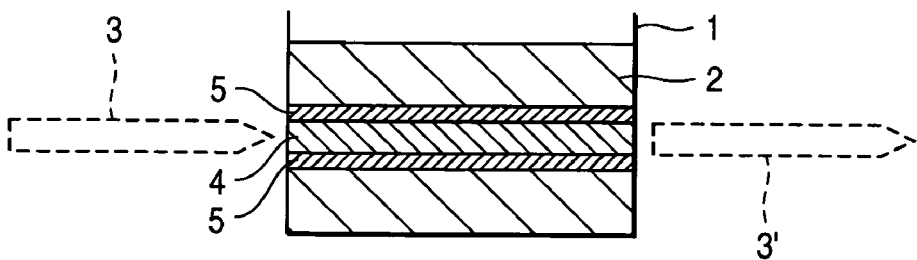
Figure 8D:
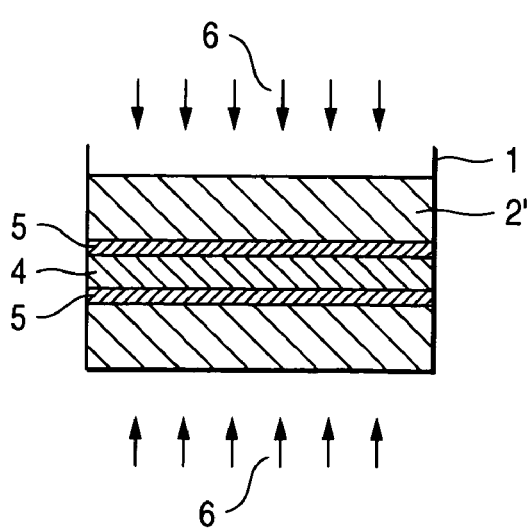

FIGS. 8A to 8D are step views for explaining a method for producing an optical waveguide according to the invention, which are similar to the steps in FIGS. 1A to 1D. A transparent vessel 1 is filled with a material composition 2 for producing an optical waveguide according to the invention. Then, the transparent vessel 1 is irradiated with first light 3 emitted from a light source and having a wavelength component $\lambda_1$ longer than the specific wavelength $\lambda_c$ of the cationic polymerization initiator and not longer than the specific wavelength $\lambda_r$ of the radical polymerization initiator (FIG. 8A). As a result, the radical polymerizable material of a low refractive index is polymerized into a pattern corresponding to the shape of light irradiation in a state in which the cationic polymerizable material of a high refractive index and the cationic polymerization initiator are enclosed in the pattern, so that an optical path portion (core) 4 cured by polymerization and transparent optically is formed once (FIG. 8B). When the first light 3 is then continuously applied for a predetermined time or longer, only the radical polymerizable material of the low refractive index is further selectively polymerized on a surface of the optical path portion (core) 4 by a light component leaked or scattered from the optical path portion (core) 4 to a side. On this occasion, the cationic polymerizable material of the high refractive index and the cationic polymerization initiator are partially enclosed in the radical polymerizable material of the low refractive index but the light component leaked or scattered is so weak that the reaction rate is lower than that of radical polymerization of the optical path portion (core) 4. As a result, the amount of the enclosed cationic polymerizable material of the high refractive index becomes so relatively small that the concentration (volume ratio) of cured part of the radical polymerizable material of the low refractive index becomes high. Thus, a layer (clad portion) 5 lower in refractive index than the optical path portion (core) 4 is formed (FIG. 8C). Then, the radical polymerizable material of the low refractive index and the cationic polymerizable material of the high refractive index remaining in the transparent vessel 1 are polymerized simultaneously by second light 6 emitted from a light source and having a wavelength component not longer than the specific wavelength $\lambda_c$ of the cationic polymerization initiator. In this manner, a base portion 2' made of a cured material higher in refractive index than the low refractive index layer (clad portion) 5 is formed. On this occasion, uncured part of the cationic polymerizable material of the high refractive index remaining in the optical path portion (core) 4 and the low refractive index layer (clad portion) 5 formed by the first light irradiation is also polymerized (FIG. 8D).

Figure 9A:
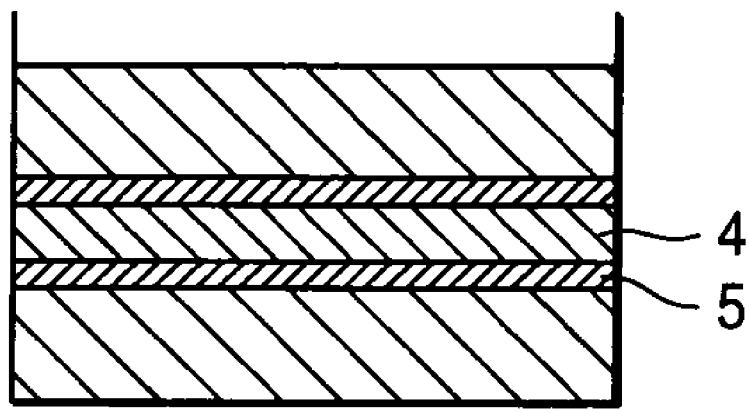
FIG. 9A is a vertical sectional view of an optical waveguide according to a specific embodiment of the invention.
Figure 9B:
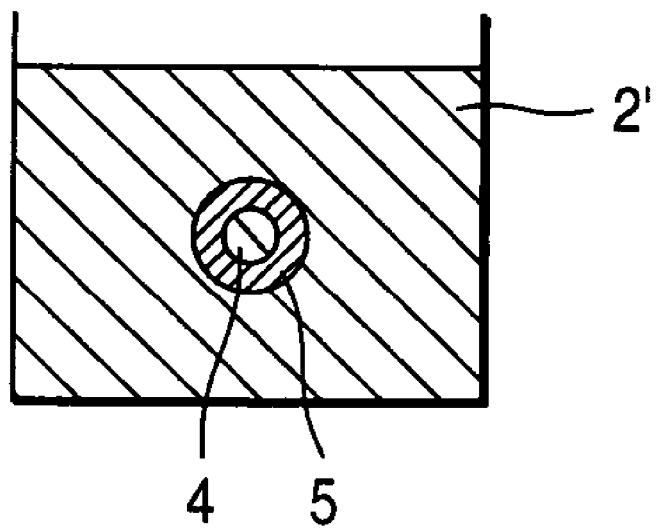
FIG. 9B is a horizontal sectional view of the optical waveguide.

FIG. 9A is a longitudinal sectional view of the optical waveguide produced by the production method depicted in FIGS. 8A to 8D. FIG. 9B is a cross sectional view of the optical waveguide. When the first light 3 shown in FIGS. 8A to 8C is a cylindrical beam, the optical path portion (core) 4 is shaped like a circle in cross section as shown in FIG. 8B. The outline of refractive index change in the case where the optical waveguide is scanned in order of the base portion 2', the low refractive index layer (clad portion) 5, the optical path portion (core) 4, the low refractive index layer (clad portion) 5 and the base portion 2' becomes same as FIG. 2. In this manner, when the composition according to the invention is used, an optical waveguide having a step index type or W type refractive index difference or refractive index distribution can be formed as shown in FIG. 2. As shown in FIG. 2, the difference between the maximum refractive index of the optical path portion (core) 4 and the minimum refractive index of the low refractive index layer (clad portion) 5 around the optical path portion (core) 4 is hereinafter expressed as $\Delta n$.

Fourth Embodiment

Seventy parts of trimethylolpropane trimethacrylate (trade name "ARONIX M-309" made by Toagosei Co., Ltd., uncured refractive index: 1.475, cured refractive index: 1.515) as a radical polymerizable material, 30 parts of bisphenol epoxy monomer (trade name "EPIKOTE 828" made by Japan Epoxy Resins Co., Ltd., uncured refractive index: 1.574, cured refractive index; 1.60) as a cationic polymerizable material, 0.35 parts of bis(2,4,6-trimethylbenzoyl)phenylphosphine oxide (trade name "IRGACURE 819" made by Ciba Specialty Chemicals Inc., $\lambda_r$=460 nm) as a radical polymerization initiator and 0.9 parts of propylene carbonate solvent-diluted bis(p-t-butylphenyl)sulfonium/triarylsulfonium hexafluorophosphate (trade name "UVI-6990" made by Union Carbide Co.) as a cationic polymerization initiator were mixed to produce a material composition for producing an optical waveguide. Then, a transparent vessel having a size of 5 mm×5 mm×15 mm was filled with the composition. The transparent vessel was irradiated with an Ar laser beam ($\lambda_1$=488 nm) at power of 25 mW for 6 minutes to thereby form a 15 mm-long core. Then, the transparent vessel was left for 120 minutes in a state in which the transparent vessel was irradiated with the Ar laser beam. Then, the transparent vessel was irradiated with UV rays at 20 mW/cm$^2$ (as light intensity at $\lambda$=365 nm) for 10 minutes to thereby cure the residual solution. The difference $\Delta n$ between the maximum refractive index of the optical path portion (core) and the minimum refractive index of the low refractive index layer (clad portion), evaluated by a two-beam interference microscope was 0-008.

Fifth Embodiment

An optical waveguide was formed in the same manner as in the first embodiment except that 70 parts of trimethylolpropane trimethacrylate (trade name "ARONIX M-309" made by Toagosei Co., Ltd., uncured refractive index: 1.475, cured refractive index: 1.515) as a radical polymerizable material, 30 parts of a 1.1 mixture (uncured refractive index: 1.541, cured refractive index: 1.57) of 1,4-bis((3-ethyl-3-oxetanyl) methoxy)benzene (trade name "OXT-121" made by Toaqosei Co., Ltd., uncured refractive index: 1.511, cured refractive index: 1.54) and bisphenol epoxy monomer (trade name "EPIKOTE 828" made by Japan Epoxy Resins Co., Ltd.) as a cationic polymerizable material, 0.35 parts of bis(2,4,6-trimethylbenzoyl)phenylphosphine oxide (trade name "IRGACURE 819" made by Ciba Specialty Chemicals Inc., $\lambda_r$=460 nm) as a radical polymerization initiator and 0.9 parts of propylene carbonate solvent-diluted bis(p-t-butylphenyl)sulfonium/triarylsulfonium hexafluorophosphate (trade name "UVI-6990" made by Union Carbide Co.) as a cationic polymerization initiator were mixed to produce a material composition for producing an optical waveguide. The difference $\Delta n$ between the maximum refractive index of the optical path portion (core) and the minimum refractive index of the low refractive index layer (clad portion) evaluated by a two-beat interference microscope was 0.007.

Other Embodiments

Optical waveguides were formed in the same manner as in the fourth embodiment except that cationic polymerizable materials C1 to C5 each having a high refractive index and radical polymerizable materials R1 to R5 each having a low refractive index as shown in Table 1 were combined as shown in Tables 2 and 3.

TABLE 1

| Sign | Content | Maker and "Trade Name" | Refractive Index |
|------|---------|------------------------|------------------|
| C1 | Bisphenol A glycidyl ether | Asahi Denka Co., Ltd. "ADEKA OPTOMER KRM-2405" | 1.573 |
| C2 | Bisphenol A glycidyl ether | The Dow Chemical Company "D.E.R.332" | 1.570 |
| C3 | Hydrogenated bisphenol A glycidyl ether | Kyoeisha Chemical Co., LTD. "EPOLIGHT 3002" | 1.500 |
| C4 | Di (1-ethyl (3-oxetanyl)) methyl ether | Toagosei Co., Ltd. "OXT-221" | 1.454 |
| C5 | Alicyclic epoxy resin | Union Carbide Co. "UVR-6110" | 1.498 |
| R1 | 2-hydroxy-3-acryloyloxypropyl methacrylate | Kyoeisha Chemical Co., LTD. "LIGHT-ESTER G-201P" | 1.473 |
| R2 | Dimethylol tricyclodecane diacrylate | Kyoeisha Chemical Co., LTD. "LIGHT-ACRYLATE DCP-A" | 1.503 |
| R3 | Pentaerythritol tetraacrylate | Kyoeisha Chemical Co., LTD. "LIGHT-ACRYLATE PE-3A" | 1.485 |
| R4 | EO-modified trimethylolpropane triacrylate | Sartomer Company, Inc. "SR-454" | 1.471 |
| R5 | Polyethylene glycol diacrylate | Kyoeisha Chemical Co., LTD. "LIGHT-ACRYLATE 4EG-A" | 1.464 |

In each of the embodiments shown in Table 2, 0.5 parts of bis(2,4,6-trimethylbenzoyl)phenylphosphine oxide (trade name "IRGACURE 819" made by Ciba Specialty Chemicals Inc., $\lambda_r$=460 nm) as a radical polymerization initiator and 3 parts of propylene carbonate solvent-diluted bis(p-t-butylphenyl)sulfonium/triarylsulfonium hexafluorophosphate (trade name "UVI-6990" made by Union Carbide Co.) as a cationic polymerization initiator were used. For formation of the core, the transparent vessel was irradiated with an Ar laser beam ($\lambda_1$=488 nm) at power of 50 mW for each time shown in Table 2 and then left for 5 minutes. Then, the transparent vessel was irradiated with UV rays at 20 mW/cm$^2$ (as light intensity at $\lambda$=365 nm) for 5 minutes.

TABLE 2

| Radical Polymerizable Material | Cationic Polymerizable Material | Core Formation Time | Difference Δn between Maximum and Minimum Refractive Indices |
|---|---|---|---|
| 50 parts of R1 | 50 parts of C1 | 90 sec | 0.0046 |
| 50 parts of R2 | 50 parts of C1 | 150 sec | 0.0045 |
| 50 parts of R3 | 50 parts of C1 | 200 sec | 0.0058 |
| 50 parts of R4 | 50 parts of C1 | 140 sec | 0.0070 |
| 50 parts of R5 | 50 parts of C1 | 125 sec | 0.0071 |

In each of the embodiments shown in Table 3, the same condition as in each of the embodiments shown in Table 2 was used except that the amount of the radical polymerization initiator and the power of the Ar laser beam ($\lambda_1$=488 nm) were changed to 0.75 parts and 80 mW respectively.

TABLE 3

| Radical Polymerizable Material | Cationic Polymerizable Material | Core Formation Time | Difference Δn between Maximum and Minimum Refractive Indices |
|---|---|---|---|
| 50 parts of R4 | 50 parts of C1 | 56 sec | 0.0071 |
| 50 parts of R4 | 50 parts of C2 | 52 sec | 0.0085 |
| 50 parts of R4 | 50 parts of C3 | 38 sec | 0.0031 |
| 50 parts of R4 | 40 parts of C1 10 parts of C4 | 45 sec | 0.0061 |
| 50 parts of R4 | 40 parts of C1 10 parts of C5 | 40 sec | 0.0066 |
| 50 parts of R4 | 40 parts of C3 10 parts of C5 | 140 sec | 0.0023 |

Incidentally, the difference Δn between the maximum refractive index of the optical path portion (core) and the minimum refractive index of the low refractive index layer (clad portion) in each of the embodiments shown in Tables 2 and 3 was evaluated by a two-beam interference microscope.

The invention is not limited to the description of mode for carrying out the invention and the description of embodiments at all. Various modifications that can be easily conceived by those skilled in the art may be included in the invention without departing from the scope of claim for a patent.

What is claimed is:

1. A method of producing an optical waveguide comprising:
    forming an optical member for use in optical transmission; and
    emitting leakage light from said optical member to cure a photo-curable resin on a surface of said optical member, said cured photo-curable resin being deposited on said surface and having a lower refractive index than a refractive index of an outer circumference of said optical member.

2. A method of producing an optical waveguide according to claim 1, wherein said curing said photo-curable resin comprises curing a mixture solution of a first photo-curable resin of a low refractive index and a second photo-curable resin of a high refractive index different in curing mechanisms,
    wherein said leakage light is capable of curing said first photo-curable resin but incapable of curing said second photo-curable resin;
    wherein said curing said photo-curable resin comprises curing both said first photo-curable resin and said second photo-curable resin after curing said first photo-curable resin by using said leakage light; and
    wherein the refractive index of at least one portion of said cured photo-curable resin decreases monotonously as the position of said cured photo-curable resin goes farther from said surface of said optical member.

3. A method of producing an optical waveguide having an optical path portion of a high refractive index and a portion of a low refractive index on a surface of the optical path portion by using a mixture solution of a first photo-curable resin of a low refractive index and a second photo-curable resin of a high refractive index different in curing mechanism, comprising:
    a first photo-curing for curing said first photo-curable resin by first light irradiation capable of curing said first photo-curable resin but incapable of curing said second photo-curable resin while enclosing said second photo-curable resin in said cured first photo-curable resin to thereby form an optical path portion transparent optically;
    a second photo-curing for curing said first photo-curable resin by second light irradiation capable of curing said first photo-curable resin but incapable of curing said second photo-curable resin in the same manner as said first light irradiation to thereby deposit said cured first photo-curable resin on said surface of said optical path portion after the formation of said optical path portion; and
    a third photo-curing for curing said second photo-curable resin enclosed in said optical path portion and uncured residual part of said mixture solution entirely by third light irradiation capable of curing both said first photo-curable resin and said second photo-curable resin.

4. A method of producing an optical waveguide according to claim 3, wherein said first light irradiation and said second light irradiation are performed simultaneously.

5. A method of producing an optical waveguide according to claim 3, wherein said first light irradiation is applied by an optical fiber.

6. A method of producing an optical waveguide having an optical path portion of a high refractive index and a portion of a low refractive index on a surface of the optical path portion by using a mixture solution of a first photo-curable resin of a low refractive index and a second photo-curable resin of a high refractive index different in curing mechanism, comprising:
    a first photo-curing of curing said first photo-curable resin by first light irradiation capable of curing said first photo-curable resin but incapable of curing said second photo-curable resin while enclosing said second photo-curable resin in said cured first photo-curable resin to thereby form an optical path portion transparent optically;

a second photo-curing for curing said first photo-curable resin by second light irradiation capable of curing said first photo-curable resin but incapable of curing said second photo-curable resin in the same manner as said first light irradiation to thereby deposit said cured first photo-curable resin on said surface of said optical path portion after the formation of said optical path portion;

extracting said portion on said surface of said optical path portion and said optical path portion made of said cured first photo-curable resin with said second photo-curable resin enclosed therein from said mixture solution; and a third photo-curing for curing said second photo-curable resin enclosed in said optical path portion and uncured residual part of said first photo-curable resin by third light irradiation capable of curing both said first photo-curable resin and said second photo-curable resin.

7. A method of producing an optical waveguide according to claim 6, wherein said first light irradiation and said second light irradiation are performed simultaneously.

8. A method of producing an optical waveguide according to claim 6, wherein said first light irradiation is applied by an optical fiber.

9. A method of producing an optical waveguide having an optical path portion of a high refractive index and a portion of a low refractive index on a surface of the optical path portion by using an optical waveguide-producing material composition, comprising:

a first photo-curing for curing a radical polymerizable material by first light irradiation at a specific wavelength capable of activating a radial polymerization initiator while enclosing at least a cationic polymerizable material and a cationic polymerization initiator in said cured radical polymerizable material to thereby form an optical path portion transparent optically;

a second photo-curing for curing said radical polymerizable material on the surface of said optical path portion by continuing said first light irradiation after the formation of said optical path portion; and a third photo-curing for curing said cationic polymerizable material enclosed in said optical path portion and uncured residual part of said composition entirely by second light irradiation capable of activating both said radial polymerization initiator and said cationic polymerization initiator.

10. A method of producing an optical waveguide according to claim 9, wherein a refractive index of the cured composition as a whole is higher by at least 0.001 than the refractive index of said cured radical polymerizable material.

11. A method of producing an optical waveguide according to claim 9, wherein said material composition for producing an optical waveguide is provided as a liquid having a viscosity of not higher than 0.1 MPa·s at 25° C.

12. A method of producing an optical waveguide according to claim 9, wherein said material composition for producing an optical waveguide further comprises a thermal polymerization initiator for initiating polymerization of said radical polymerizable material by heating.

13. A method of producing an optical waveguide having an optical path portion of a high refractive index and a portion of a low refractive index on a surface of the optical path portion by using an optical waveguide-producing material composition, comprising:

a first photo-curing for curing a radical polymerizable material by first light irradiation at a specific wavelength capable of activating a radial polymerization initiator while enclosing at least a cationic polymerizable material and a cationic polymerization initiator in said cured radical polymerizable material to thereby form an optical path portion transparent optically;

a second photo-curing for curing said radical polymerizable material on the surface of said optical path portion by continuing said first light irradiation after the formation of said optical path portion;

extracting cured part immersed in uncured part from uncured residual part of said composition; and a third photo-curing for curing said uncured part immersed in said cured part by second light irradiation capable of activating both said radial polymerization initiator and said cationic polymerization initiator.

14. A method of producing an optical waveguide according to claim 13, wherein a refractive index of the cured composition as a whole is higher by at least 0.001 than the refractive index of said cured radical polymerizable material.

15. A method of producing an optical waveguide according to claim 13, wherein said material composition for producing an optical waveguide is provided as a liquid having a viscosity of not higher than 0.1 MPa·s at 25° C.

16. A method of producing an optical waveguide according to claim 13, wherein said material composition for producing an optical waveguide further comprises a thermal polymerization initiator for initiating polymerization of said radical polymerizable material by heating.

17. A method of producing an optical waveguide according to claim 9, wherein said optical waveguide-producing material composition comprises:

a radical polymerizable material;

a cationic polymerizable material;

a radical polymerization initiator for initiating polymerization of said radical polymerizable material by light irradiation; and a cationic polymerization initiator for initiating polymerization of said cationic polymerizable material by light irradiation, wherein light irradiation at a specific wavelength is effective in activating said radical polymerization initiator but ineffective in activating said cationic polymerization initiator, and wherein a refractive index of said cured radical polymerizable material is lower than a refractive index of said cured cationic polymerizable material.

18. A method of producing an optical waveguide according to claim 1, wherein said photo-curable resin is contained in a transparent vessel, and wherein said forming said optical member and said emitting said leakage light comprise irradiating said transparent vessel with a same light.

\* \* \* \* \*